(12) United States Patent
Demura et al.

(10) Patent No.: US 7,286,924 B2
(45) Date of Patent: Oct. 23, 2007

(54) KNOCKING DETERMINING APPARATUS OF INTERNAL COMBUSTION ENGINE

(75) Inventors: Takayuki Demura, Mishima (JP);
Shigemasa Hirooka, Susono (JP);
Tetsuji Nagata, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 300 days.

(21) Appl. No.: 11/188,805

(22) Filed: Jul. 26, 2005

(65) Prior Publication Data

US 2006/0021422 A1    Feb. 2, 2006

(30) Foreign Application Priority Data

Jul. 29, 2004    (JP)    ............................ 2004-222259

(51) Int. Cl.
*G01L 23/22*    (2006.01)
*F02P 5/152*    (2006.01)

(52) U.S. Cl. ..................... 701/111; 73/35.04; 73/35.06; 123/406.37; 123/431

(58) Field of Classification Search ........... 123/406.29, 123/406.37, 406.47, 431; 73/35.01, 35.03–35.06; 701/111

See application file for complete search history.

(56) References Cited

U.S. PATENT DOCUMENTS 7,152,574 B2 *    12/2006    Mashiki et al. ............. 123/431

FOREIGN PATENT DOCUMENTS

| EP | 1 378 644 A2 | 1/2004 |
|----|--------------|--------|
| EP | 1 531 324 A2 | 5/2005 |
| JP | A-02-191819 | 7/1990 |
| JP | A-05-231221 | 9/1993 |
| JP | A-07-103048 | 4/1995 |
| JP | A-11-303669 | 11/1999 |
| JP | A-2001-020837 | 1/2001 |
| JP | A-2004-197577 | 7/2004 |

* cited by examiner

*Primary Examiner*—T. M Argenbright
(74) *Attorney, Agent, or Firm*—Oliff & Berridge, PLC

(57) ABSTRACT

A knocking determining apparatus of an internal combustion engine that includes an in-cylinder injector and an intake port injector and that determines knocking based on an output signal of a knock sensor. The knocking determining apparatus includes a knocking determination prohibition unit prohibiting, when a ratio of fuel injection from the in-cylinder injector and the intake port injector is changed, knocking determination for a prescribed period after that change, or a knocking determination level change unit changing a knocking determination level for a prescribed period after that change.

14 Claims, 11 Drawing Sheets

F I G. 9
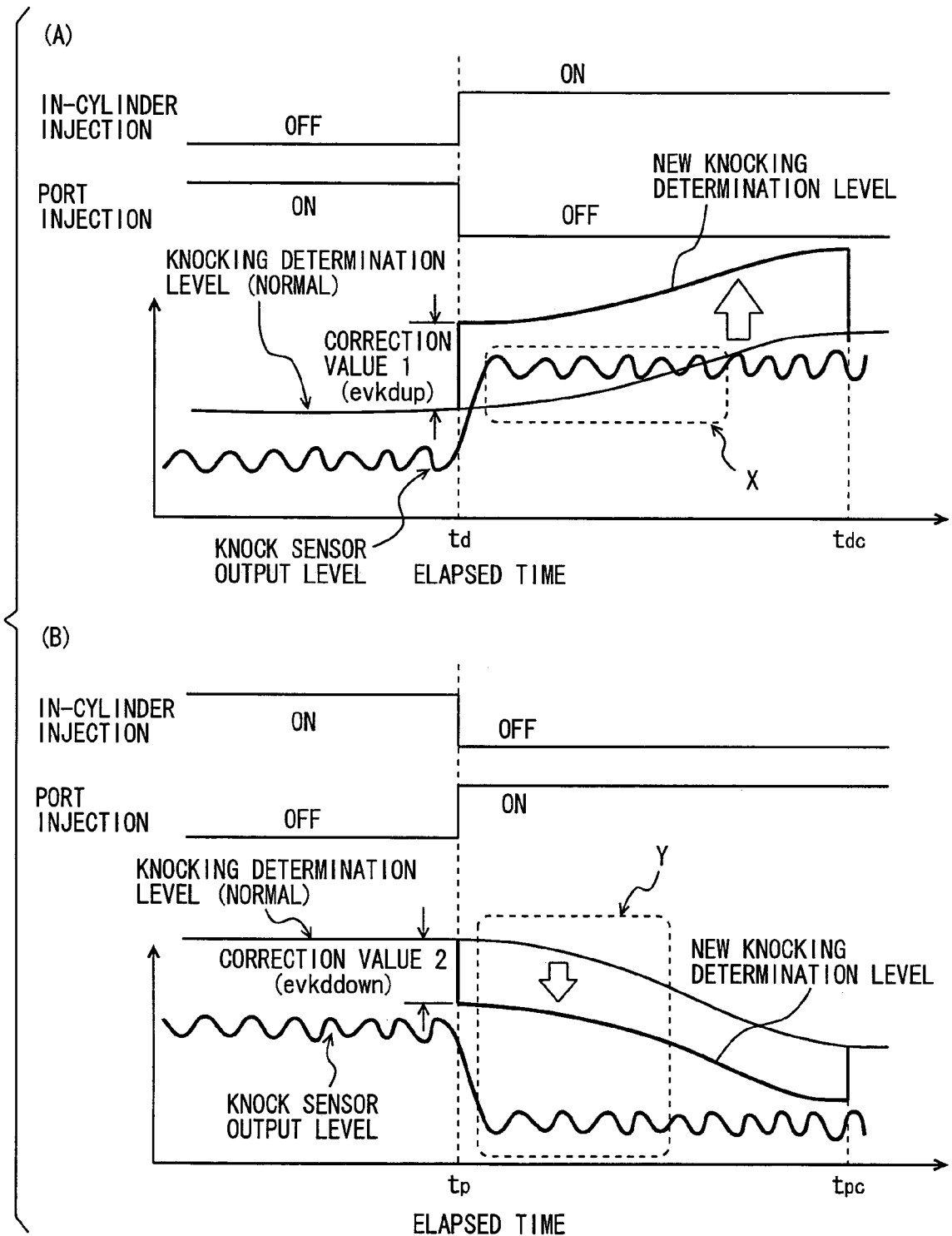

FIG. 11
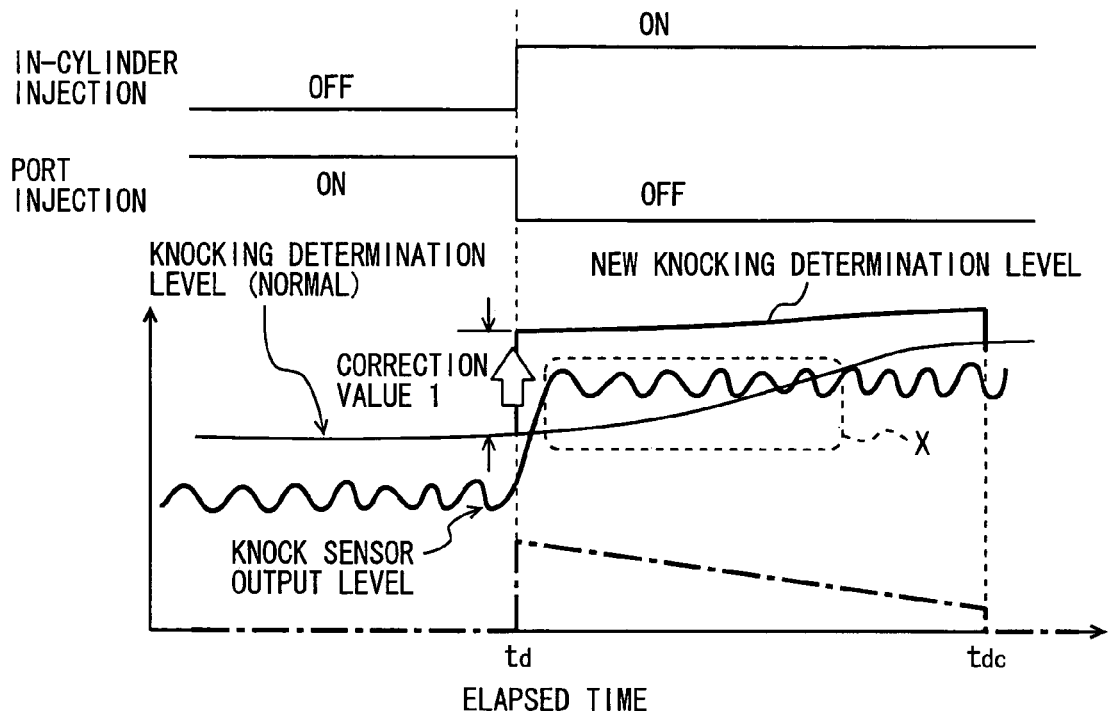
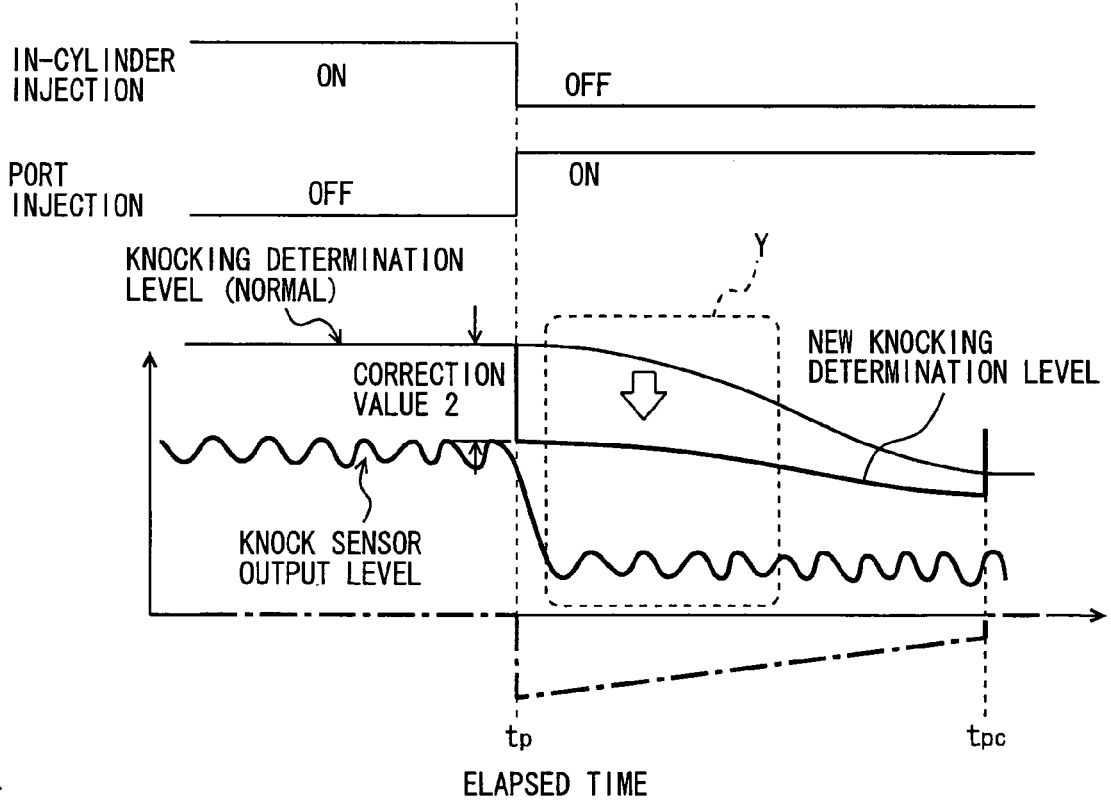

KNOCKING DETERMINING APPARATUS OF INTERNAL COMBUSTION ENGINE

This nonprovisional application is based-on Japanese Patent Application No. 2004-222259 filed with the Japan Patent Office on Jul. 29, 2004, the entire contents of which are hereby incorporated by reference.

BACKGROUND OF THE INVENTION

1. Field of the Invention

The present invention relates to a knocking determining apparatus of an internal combustion engine, and more specifically, to a knocking determining apparatus of an internal combustion engine including an in-cylinder injector injecting a fuel into a cylinder and an intake port injector injecting a fuel into an intake manifold or an intake port.

2. Description of the Background Art

In general, what is called a dual-injection-type internal combustion engine including an in-cylinder injector injecting a fuel into a cylinder and an intake port injector injecting a fuel into an intake manifold or an intake port is known (Japanese Patent Laying-Open No. 2001-020837 and the like), in which use of these injectors is switched in accordance with an operation state of the engine so as to realize stratified charge combustion in a low-load operation region and homogeneous combustion in a high-load operation region and so as to inject the fuel at a prescribed injection ratio in accordance with the operation state, for achieving improvement in fuel efficiency characteristic and output characteristic.

Normally, in an combustion engine, knocking determination for determining whether or not knocking has occurred is performed, and based on the result, what is called knocking control is executed, in which ignition timing and the like is controlled. The knocking determination is performed using a knock sensor that is a vibration detecting sensor arranged at a cylinder block or the like and based on an output signal of the knock sensor after ignition in each cylinder, whereby occurrence of knocking is determined (Japanese Patent Laying-Open No. 07-103048 and the like).

Generally, an injector injecting fuel in an internal combustion engine is configured to open a valve to start fuel injection by providing an electric current to an electromagnetic solenoid so that a nozzle needle is driven to be separated from a valve seat, and to close the valve to stop fuel injection by stopping electricity to the electromagnetic solenoid so that the nozzle needle is seated on the valve seat. Such an injector, with its open-close operation, generates vibrations, e.g., hitting noises when the nozzle needle is seated on the valve seat. The vibrations generated in accordance with the open-close operation of the injector may be superimposed on an output signal of the knock sensor as operation noises. In particular, as the in-cylinder injector is arranged closer to the knock sensor as compared to the intake port injector, the operation noises generated by the open-close operation of the injector tend to impose greater effect on the output signal of the knock sensor. Further, when the combustion speed of an air-fuel mixture is accelerated due to a change in a fuel injection ratio of the in-cylinder injector to be increased, the vibrations occurring in accordance with combustion of the air-fuel mixture are increased. This also tends to contribute to increase the engine vibration level.

Accordingly, in the aforementioned internal combustion engine, for example, as described above, since the engine vibration level and the like also changes when fuel injection from the intake port injector is switched to fuel injection from the in-cylinder injector, or when an injection ratio of the in-cylinder injector is changed to increase, an output value of the knock sensor abruptly increases. Although the level of background noise (the normal vibration level) gradually rises also, it may be erroneously determined that knocking has occurred, while the knocking has not occurred actually. As a result, ignition timing may be erroneously retarded, which may impair drivability.

Conversely, when fuel injection from the in-cylinder port injector is switched to fuel injection from the intake port injector, or when an injection ratio of the intake port injector is changed to increase, an output value of the knock sensor abruptly decreases. Although the level of background noise gradually falls also, it may be erroneously determined that no knocking has occurred, while the knocking has occurred actually. As a result, ignition timing may be erroneously advanced, which may cause further greater knocking.

SUMMARY OF THE INVENTION

The present invention has been made in light of forgoing, and an object thereof is to provide, in an internal combustion engine including an intake port injector and an in-cylinder injector, a knocking determining apparatus of the internal combustion engine, that is capable of suppressing erroneous retardation control and erroneous advancement control of ignition timing by knocking control.

In order to achieve the object above, a knocking determining apparatus of an internal combustion engine that includes an in-cylinder injector and an intake port injector and that determines knocking based on an output signal of a knock sensor according to one embodiment of the present invention is characterized in that it includes a knocking determination prohibition unit prohibiting, when a ratio of fuel injection from the in-cylinder injector and the intake port injector is changed, knocking determination for a prescribed period after that change.

In order to achieve the object above, a knocking determining apparatus of an internal combustion engine that includes an in-cylinder injector and an intake port injector and that determines knocking based on an output signal of a knock sensor according to another embodiment of the present invention is characterized in that it includes a knocking determination level change unit changing, when a ratio of fuel injection from the in-cylinder injector and the intake port injector is changed, a knocking determination level for a prescribed period after that change.

Here, preferably, the knocking determination level change unit increases the knocking determination level when a ratio of fuel injection from the in-cylinder injector is increased.

Additionally, preferably, the knocking determination level change unit decreases the knocking determination level when a ratio of fuel injection from the intake port injector is increased.

Further, the knocking determination level change unit may change the knocking determination level in accordance with an elapsed time.

It is noted that, in the present specification, unless otherwise specified, "change in the fuel injection ratio" encompasses change between injection only from the in-cylinder injector (that is, in-cylinder injection ratio 100%) and injection only from the intake port injector (that is, in-cylinder injection ratio 0%), i.e., switching of injection between in-cylinder injection 100% and port injection 100%, as well as change in the ratio of fuel injection from these injectors when both of these injectors simultaneously inject the fuel at a prescribed injection ratio.

According to the knocking determining apparatus of an internal combustion engine that includes an in-cylinder injector and an intake port injector and that determines knocking based on an output signal of a knock sensor according to one embodiment of the present invention, when a ratio of fuel injection from the in-cylinder injector and the intake port injector is changed, knocking determination for a prescribed period after that change is prohibited by the knocking determination prohibition unit. Therefore, erroneous determination is not made and erroneous retardation control or erroneous advancement control of ignition timing is prevented.

According to the knocking determining apparatus of an internal combustion engine that includes an in-cylinder injector and an intake port injector and that determines knocking based on an output signal of a knock sensor according to another embodiment of the present invention, when a ratio of fuel injection from the in-cylinder injector and the intake port injector is changed, a knocking determination level for a prescribed period after that change is changed by the knocking determination level change unit. Therefore, even when the level of engine vibration changes in accordance with change in the fuel injection ratio, the knocking determination level is set following that change. Accordingly, occurrence of knocking in an internal engine where the ratio of fuel injection is variably set can suitably be detected, whereby erroneous retardation control and erroneous advancement control is prevented, and the reliability of a knocking determination result is improved.

Here, according to a manner in which the knocking determination level change unit increases the knocking determination level when a ratio of fuel injection from the in-cylinder injector is increased, an erroneous determination, such as determining an increase in the background noise level actually resulted from an increasing output signal of the knock sensor in accordance with an increasing ratio of fuel injection from the in-cylinder injector as described above to be due to knocking, can surely be prevented.

According to a manner in which the knocking determination level change unit decreases the knocking determination level when a ratio of fuel injection from the intake port injector is increased, an erroneous determination of no knocking occurrence can surely be prevented, which is due to an output value of the knock sensor becoming smaller as the ratio of fuel injection from the intake port injector increases as described above. Thus, knocking occurrence after the background noise level is stabilized caused by erroneous advancement of ignition timing can be suppressed.

Further, according to a manner in which the knocking determination level change unit changes the knocking determination level in accordance with an elapsed time, the normal knocking determination level that is set based on the background noise level stabilizing in accordance with an elapsed time can more quickly be approximated. Thus, knocking determination can be made more accurately.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a time chart showing a manner of change of the knocking determination level in the third embodiment of the knocking determining apparatus of an internal combustion engine according to the present invention, in which (A) shows switching from port injection to in-cylinder injection, and (B) shows switching from in-cylinder injection to port injection.

FIG. 11 is a time chart showing a manner of change of the knocking determination level in the fourth embodiment of the knocking determining apparatus of an internal combustion engine according to the present invention, in which (A) shows switching from port injection to in-cylinder injection, and (B) shows switching from in-cylinder injection to port injection.

DESCRIPTION OF THE PREFERRED EMBODIMENTS

Embodiments implementing a knocking determining apparatus of an internal combustion engine according to the present invention will be described hereinafter with reference to the accompanying drawings.

Figure 1:
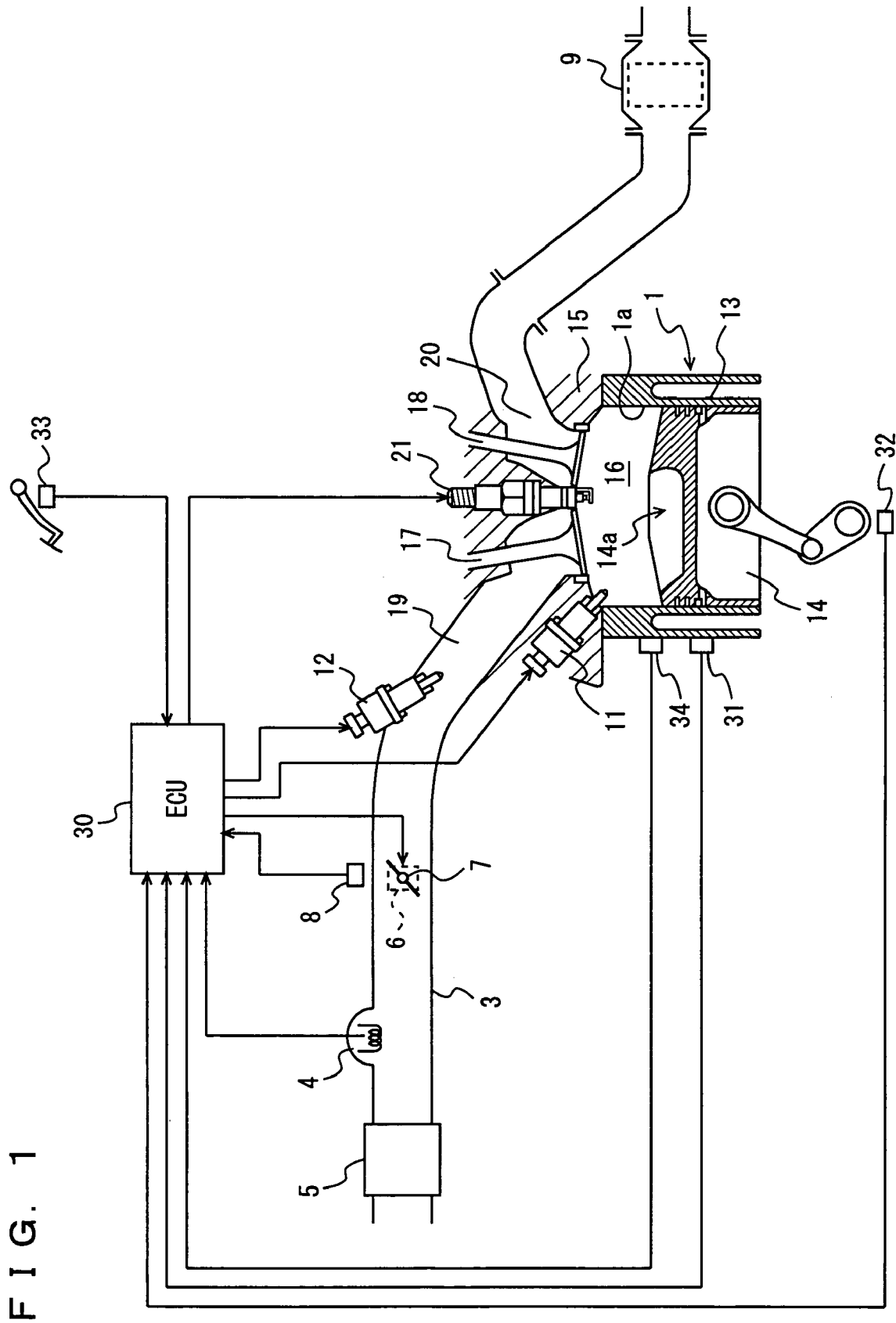
FIG. 1 is a schematic diagram showing an overall structure of an internal combustion engine.

Initially, referring to FIG. 1 showing an overall structure of the knocking determining apparatus of an internal combustion engine according to the present invention, an engine 1 is implemented as a gasoline engine including a plurality of, for example, four cylinders 1a. Each cylinder 1a is connected to an intake pipe 3 via a corresponding intake manifold, and intake pipe 3 is connected to an air cleaner 5 with an airflow meter 4 being interposed. In intake pipe 3, a throttle valve 7 driven by a throttle motor 6 such as a direct-current motor is disposed. Meanwhile, each cylinder 1a is coupled to a common exhaust manifold, which is coupled, for example, to a three-way catalyst converter 9.

An in-cylinder injector 11 for injecting the fuel into the cylinder and an intake port injector 12 for injecting the fuel into an intake manifold or an intake port are attached to each cylinder 1a. As will be described later, injectors 11 and 12 are controlled based on output signals from an electronic control unit 30. In addition, each in-cylinder injector 11 is connected to a not-shown common fuel delivery pipe, which is connected to a high-pressure pump. Meanwhile, each intake port injector 12 is similarly connected to a not-shown common fuel delivery pipe, which is connected to a low-pressure pump.

Moreover, engine 1 includes a cylinder block 13, a piston 14 having a concave portion 14a formed in its top surface, a cylinder head 15 fastened to cylinder block 13, a combustion chamber 16 formed between piston 14 and cylinder head 15, an intake valve 17, an exhaust valve 18, an intake port 19, an exhaust port 20, and a spark plug 21 turned on by a not-shown igniter. Intake port 19 is formed such that air that has flown into combustion chamber 16 causes swirl around a cylinder axis. Concave portion 14a on the top surface of piston 14 is formed such that it extends from a peripheral portion to a central portion of piston 14 positioned on in-cylinder injector 11 side and extends toward spark plug 21.

Electronic control unit (hereinafter, also referred to as ECU) 30 is implemented by a digital computer, and includes an ROM (read-only memory), an RAM (random access memory), a CPU (microprocessor), an input/output port, and the like connected to one another via a bidirectional bus. Airflow meter 4 generates an output voltage proportional to an intake air quantity, which is input to an input port of ECU 30 through an AD converter. In addition, a throttle opening position sensor 8 generating an output voltage proportional to an opening position of throttle valve 7, a water temperature sensor 31 generating an output voltage proportional to a cooling water temperature, an engine speed sensor 32 generating an output pulse representing the engine speed, an accelerator press-down degree sensor 33 generating an output voltage proportional to a degree of pressing down of an accelerator pedal (hereinafter, referred to as accelerator press-down degree), a knock sensor 34 arranged in cylinder block 13 and generating an output voltage proportional to vibration transmitted from combustion chamber 16 to cylinder block 13 in each cylinder, and the like are provided. Output voltages from these components are similarly input to ECU 30. The fuel injection ratio and a fuel injection quantity, set in correspondence with the operation state based on an engine load factor obtained from airflow meter 4 or accelerator press-down degree sensor 33 described above and the engine speed obtained from engine speed sensor 32, as well as a correction value for the former based on a temperature of the engine cooling water are mapped in advance and stored in the ROM in ECU 30. As to the ignition timing and the throttle opening position, optimal values for the ignition timing and the throttle opening position that have been set in correspondence with the operation region based on the accelerator press-down degree and the engine speed obtained from accelerator press-down degree sensor 33 and engine speed sensor 32 are mapped in advance and stored. In addition, an output port of ECU 30 is connected to throttle motor 6, each in-cylinder injector 11, each intake port injector 12, and the igniter of spark plug 21 via a corresponding drive circuit. ECU 30 controls the engine in a variety of manners, such as fuel injection control or ignition timing control, in accordance with the operation state of engine 1 known from a detection signal of such various sensors.

Figure 2:
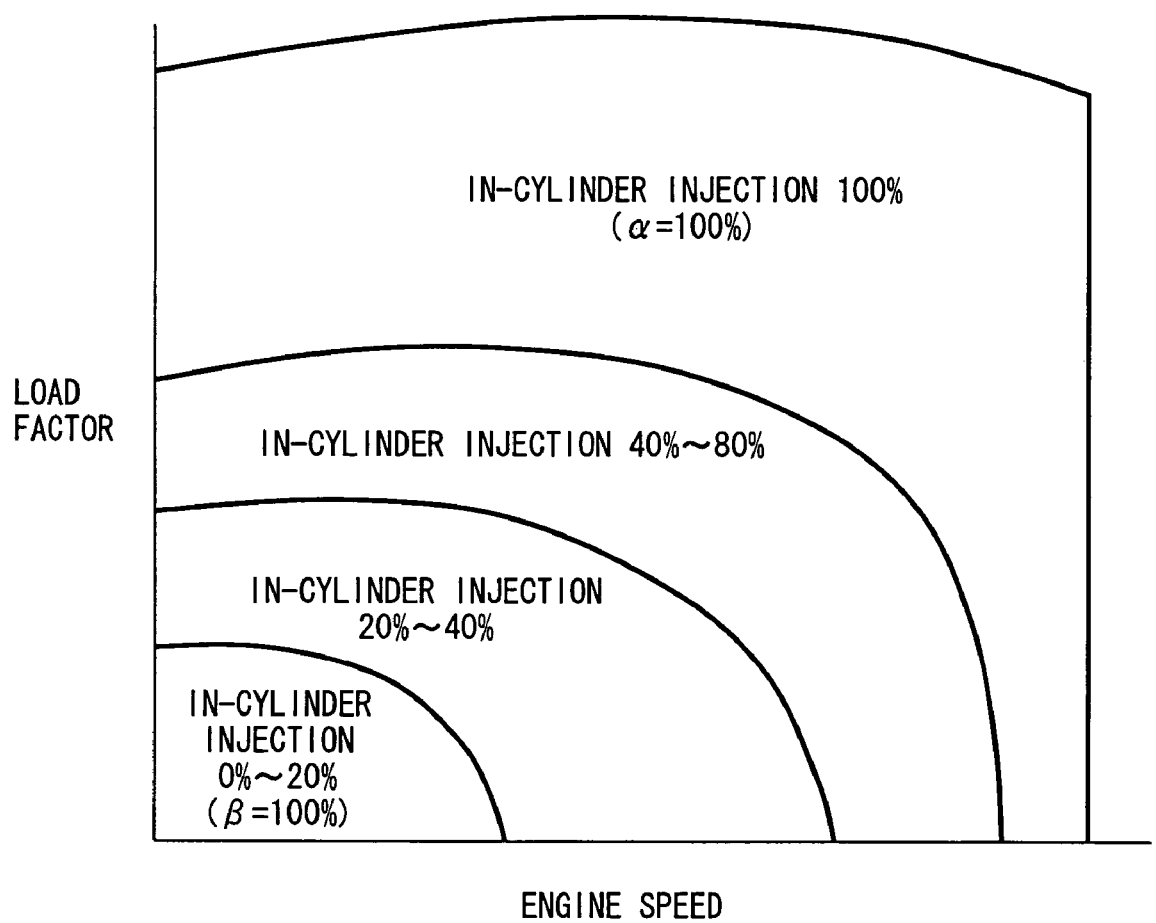
FIG. 2 is a graph showing exemplary relation between an operation state of the internal combustion engine and a fuel injection ratio at that time.

In engine 1 of the present embodiment, for example, a combustion manner or an injection manner is set in correspondence with the operation region or a condition map as shown in FIG. 2, and ratio $\alpha$ and ratio $\beta$ of injection from in-cylinder injector 11 and intake port injector 12 respectively are determined. Here, in-cylinder injection ratio $\alpha$ represents a ratio of a quantity of fuel injected from in-cylinder injector 11 to the total fuel injection quantity, while port injection ratio $\beta$ represents a ratio of a quantity of fuel injected from intake port injector 12 to the total fuel injection quantity. Here, $\alpha+\beta=100\%$. In FIG. 2, in-cylinder injection 100% represents a region where ratio $\alpha$ of injection only from in-cylinder injector 11 is set to 100%, that is, $\beta=0\%$. Meanwhile, in-cylinder injection 0% represents a region where ratio $\beta$ of injection only from intake port injector 12 is set to 100%, that is, $\alpha=0\%$. Furthermore, in-cylinder injection 40-80% means that $\alpha$ is set to 40-80% and $\beta$ is set to 60-20%, however, values for ratio $\alpha$ and ratio $\beta$ may be varied as appropriate, in accordance with the operation condition required to engine 1 that is used.

As described above, in engine 1 of the present embodiment, the injection manner is changed in accordance with the engine operation state, so as to ensure homogeneity of an air-fuel mixture and to improve output of engine 1 in the high-load region. Specifically, use of intake port injector 12 tends to promote homogeneity of the air-fuel mixture, as compared with the use of in-cylinder injector 11. Accordingly, in the operation region from low load to intermediate load, in-cylinder injector 11 and intake port injector 12 are used to attain a different fuel injection ratio therebetween so as to ensure homogeneity of the air-fuel mixture and to improve combustion. Meanwhile, when in-cylinder injector 11 is used for fuel injection, due to the latent heat of vaporization, lowering in the temperature of the air-fuel mixture and in the temperature in the combustion chamber is more likely than when intake port injector 12 is used for fuel injection. Therefore, in-cylinder injector 11 is used in the high-load operation region, so that efficiency in charging the air is enhanced and engine output is improved.

Figure 3:
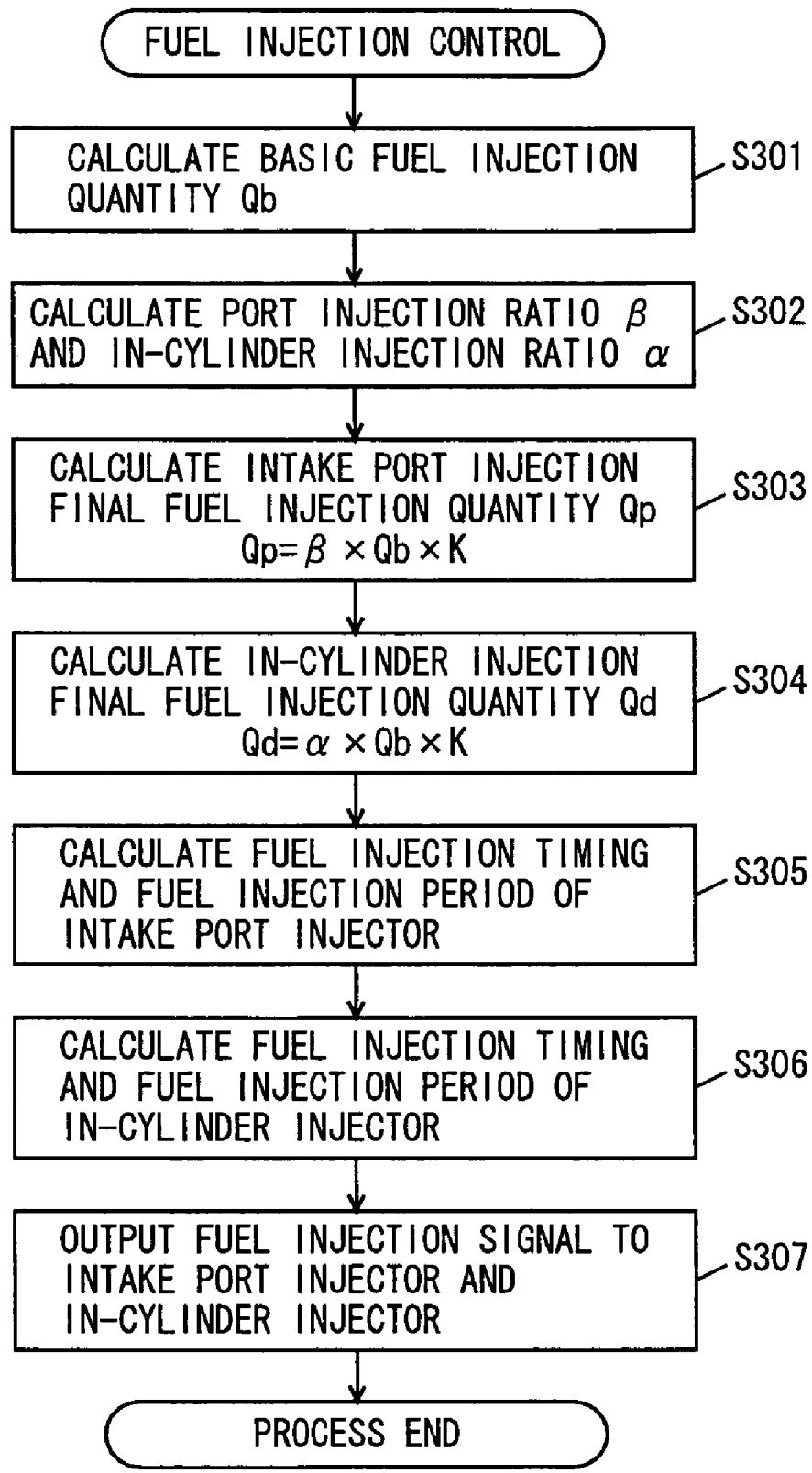
FIG. 3 is a flowchart showing an exemplary process procedure of fuel injection control of the internal combustion engine.

First, referring to a flowchart of FIG. 3, a process procedure of fuel injection control of engine 1 according to the present embodiment will be described. It is noted that the process shown in FIG. 3 is repeated in a prescribed cycle. Accordingly, at step S301, based on the aforementioned engine load factor determined by accelerator press-down degree or intake air quantity as well as parameter such as engine speed, a basic fuel injection quantity Qb is calculated. Here, calculation of the basic fuel injection quantity is performed referring to an operation map for injection quantity calculation that has been stored in a memory of ECU 30 in advance.

Next, at step S302, a ratio of fuel supplied to combustion chamber 16 by intake port injector 12 and by in-cylinder injector 11, i.e., port injection ratio $\beta$ and in-cylinder injection ratio $\alpha$ defining fuel injection ratios of respective injectors, are determined based on an engine operation state. The in-cylinder injection ratio $\alpha$ and port injection ratio $\beta$ are as shown in FIG. 2.

At step S303, based on port injection ratio $\beta$ and basic fuel injection quantity Qb and from the following equation (1), a port injection final fuel injection quantity Qp by intake port injector 12 is calculated. It is noted that correction coefficient K is various types of correction term that is set based on a cooling water temperature of engine 1, air-fuel ratio control or the like.

$$Qp = \beta \times Qb \times K \quad (1)$$

At step S304, based on in-cylinder injection ratio a and basic fuel injection quantity Qb and from the following equation (2), in-cylinder injection final fuel injection quantity Qd is calculated. It is noted that, as described above, correction coefficient K is various types of correction term that is set based on a cooling water temperature of engine 1, air-fuel ratio control or the like.

$$Qd = \alpha \times Qb \times K \qquad (2)$$

As expressed by equation (2), as in-cylinder injection ratio α increases, the fuel injection quantity injected from in-cylinder injector 11 increases.

At step S305, based on the engine speed, engine load factor and the like, fuel injection timing of intake port injector 12 is calculated. The fuel injection timing calculated here is timing for initiating fuel injection from intake port injector 12 at each cylinder being expressed by a crank angle relative to the top dead center of each cylinder. Further, based on thus calculated port injection final fuel injection quantity Qp and the engine speed, a period (a crank angle) required for injecting the fuel by the calculated fuel injection quantity from intake port injector 12 is calculated. As to the calculation of fuel injection timing and injection period also, similarly to basic fuel injection quantity Qb, it is performed referring to the operation map for calculating the injection timing and injection period that has been stored in a memory of ECU 30 in advance.

At next step S306, similarly, fuel injection timing of in-cylinder injector 11 is calculated based on the engine speed, engine load factor and the like. The fuel injection timing calculated here is also timing for initiating fuel injection from in-cylinder injector 11 at each cylinder being expressed by a crank angle relative to the top dead center of each cylinder. Further, based on thus calculated in-cylinder injection final fuel injection quantity Qd and the engine speed, a period (a crank angle) required for injecting the fuel by the calculated fuel injection quantity from in-cylinder injector 11 is calculated. As to the calculation of fuel injection timing and injection period also, similarly to basic fuel injection quantity Qb, it is performed referring to the operation map for calculating the injection timing and injection period that has been stored in a memory of ECU 30 in advance.

At step S307, based on the fuel injection timing and fuel injection period calculated for each injector, fuel injection signals are generated for each cylinder and provided to each of intake port injector 12 and in-cylinder injector 11 provided in correspondence with each cylinder. The fuel injection signal is turned on from the timing indicated by the fuel injection timing and for the period indicated by the fuel injection period.

When the fuel injection signal is turned on, supply of an electric current to the electromagnetic solenoid of intake port injector 12 or in-cylinder injector 11 is started. By the electromagnetic attraction force generated thereby, the nozzle needle is driven to be separated from the valve seat. Thus, an injection hole of intake port injector 12 or in-cylinder injector 11 is opened to initiate fuel injection. On the other hand, when the fuel injection signal is turned off, the supply of the current to the electromagnetic solenoid is stopped, and the nozzle needle is seated on the valve seat. Thus, the injection hole is closed and the fuel injection is stopped.

Thus, during a period where a fuel injection signal is turned on, fuel injection from intake port injector 12 or in-cylinder injector 11 is performed. Accordingly, to combustion chamber 16 of each cylinder, fuel is supplied by injection at proper timing and in a proper quantity in accordance with an engine operation state.

Next, ignition timing control in engine 1 by ECU 30 will be described. Based on the result of detection by knock sensor 34 described above, ECU 30 carries out knocking determination for determining occurrence of knocking in each cylinder. In accordance with the result, ECU 30 exerts knock control for adjusting the ignition timing.

Specifically, if it is determined in knocking determination that knocking has occurred, the final ignition timing "AOP" is retarded by a prescribed amount. If it is determined that no knocking has occurred, the final ignition timing "AOP" is gradually advanced. The final ignition timing "AOP" is timing for exerting ignition at each cylinder being expressed by a crank angle (BTDC) relative to the top dead center of each cylinder, and calculated based on the equation below (3).

$$AOP = ABASE - (AKMAX - AGKNK + AKCS) \leq ABASE \qquad (3)$$

where
AOP: final ignition timing;
ABASE: basic ignition timing;
AKMAX: maximum retardation amount;
AGKNK: knocking learning amount; and
AKCS: feedback correction amount.

In equation (3), basic ignition timing "ABASE" represents ignition timing at which maximum engine output can be obtained, on the premise that knocking does not occur. The maximum retardation amount "AKMAX" represents a correction amount for correcting basic ignition timing "ABASE" to be retarded to attain timing that surely prevents knocking. The basic ignition timing "ABASE" and maximum retardation amount "AKMAX" are set based on the engine operation state represented by parameters such as the engine speed, the engine load factor and the like.

Further, in equation (3), feedback correction amount "AKCS" and knocking learning amount "AGKNK" are the correction amount for correcting, in accordance with occurrence of knocking, final ignition timing "AOP" to be retarded to suppress this knocking, and they increase or decrease depending on occurrence of knocking. Feedback correction amount "AKCS" is changed to retard final ignition timing "AOP" when knocking occurs, and changed to advance final ignition timing "AOP" when knocking does not occur.

Knocking learning amount "AGKNK" is changed so that feedback correction amount "AKCS" falls within a predetermined range determined in advance. If feedback correction amount "AKCS" is deviated from the aforementioned prescribed range to retard final ignition timing "AOP", then knocking learning amount "AGKNK" is changed to retard final ignition timing "AOP". If feedback correction amount "AKCS" is deviated from the aforementioned prescribed range to advance final ignition timing "AOP", then knocking learning amount "AGKNK" is changed to advance final ignition timing "AOP". As can be seen from equation (3), final ignition timing "AOP" has its upper limit defined by "ABASE" in order not to be advanced more than or equal to a set advance value by an ignition timing correction by the knock control.

ECU 30 outputs to the igniter of spark plug 21 of each cylinder an ignition signal which is turned on at timing indicated by final ignition timing "AOP" thus calculated, whereby ignition is carried out. Thus, the ignition timing is adjusted to approximate knocking occurrence limit.

Figure 4:
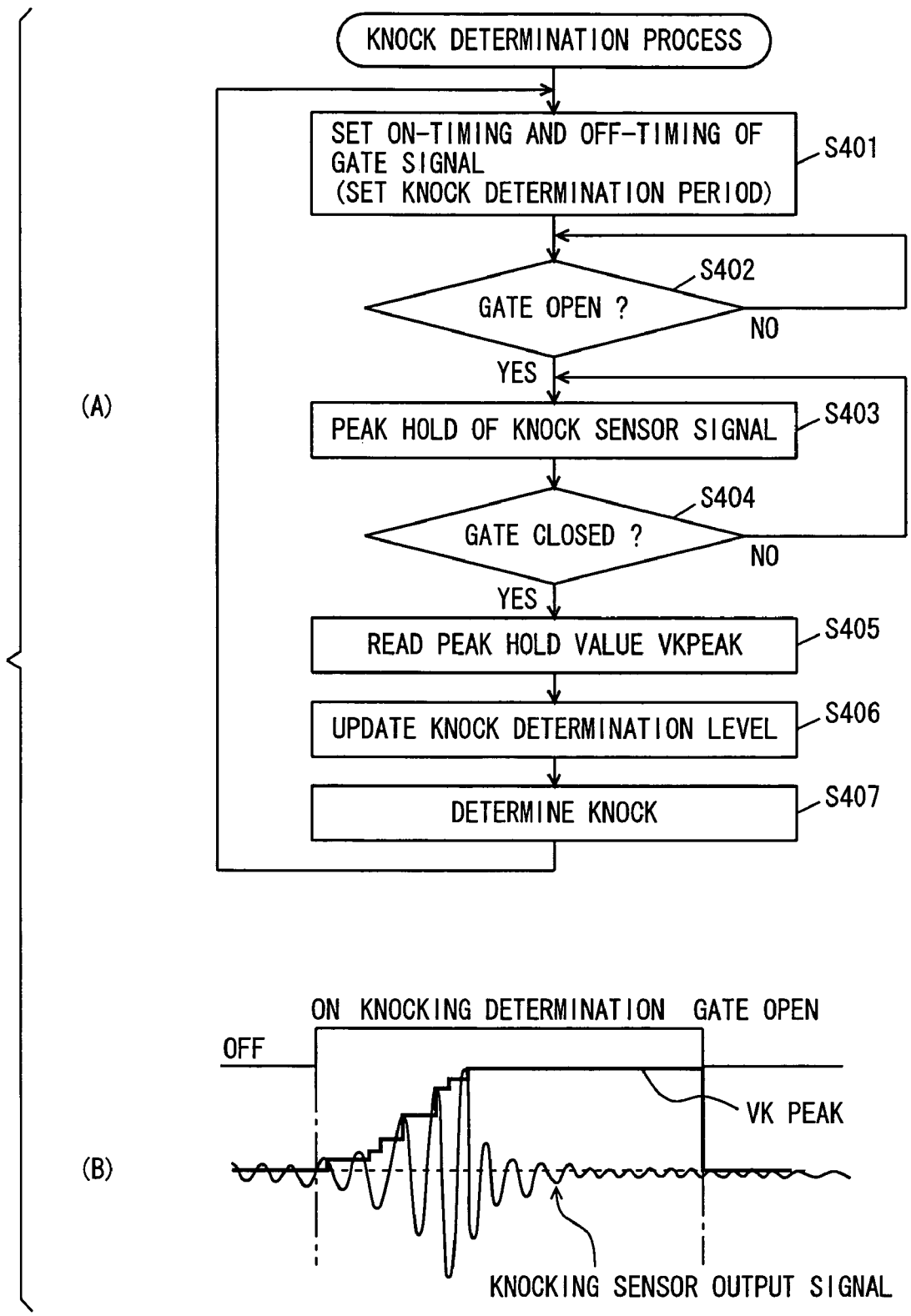
FIG. 4 includes a flowchart (A) and a time chart (B) showing an exemplary process procedure of knocking determination of the internal combustion engine.

Next, an exemplary basic process procedure of knocking determination in the aforementioned knock control is shown in the flowchart of FIG. 4(A) and the time chart of FIG. 4(B).

A series of process steps shown in FIGS. 4(A) and (B) is initiated when a condition for starting knock control is met after the engine is started. When this knocking determination process is started, first at step S401, on-timing and off-timing of a gate signal are set. The gate signal determines a period for sampling an output signal of knock sensor 34 related to the knocking determination, and the knocking determination is carried out referring to the output signal value of knock sensor 34 in a period during which the gate signal is turned on. Specifically, here, the period where the gate signal is turned on corresponds to "a knocking determination period" where the knocking determination based on the output signal of knock sensor 34 is carried out. It is noted that the on-timing and the off-timing of the gate signal are expressed by a crank angle (ATDC) relative to top dead center of each cylinder.

Here, setting of the on-timing and the off-timing of the gate signal is performed referring to an operation map for calculating a determination period that is stored in a memory of ECU 30 in advance. The operation map for calculating a determination period is set as a two-dimensional map of engine speed and engine load factor.

Figure 5:
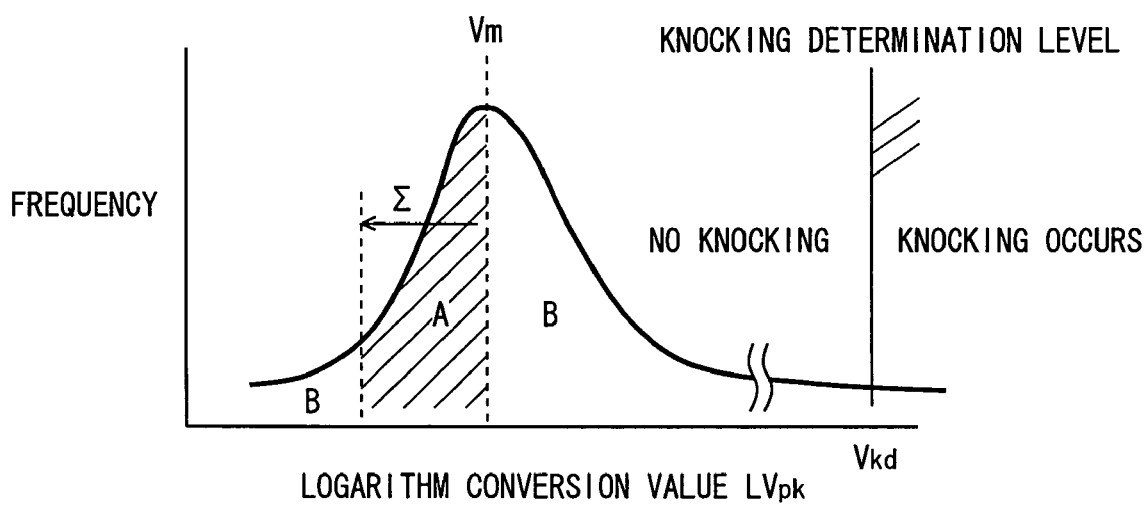
FIG. 5 is a graph showing an exemplary normal distribution that is set in the knocking determination process.

When the knocking determination period has been set, the knocking determination is performed for each cylinder, through the process of steps S402-S407. In the present embodiment, the knocking determination is performed based on a peak hold value "VKPEAK" (maximum value) of an output signal of knock sensor 34 in the knocking determination period. A knocking determination scheme employed here is, on the premise that a logarithm conversion value "LVpk" of peak hold value "VKPEAK" shows normal distribution as shown in FIG. 5, to determine occurrence of knocking by the position of logarithm conversion value "LVpk" sampled this time in that distribution.

When the gate signal is turned on and a gate for knocking determination is opened (step S402=YES), the process goes to step S403, where a peak hold is started for the output signal of knock sensor 34 of a target cylinder. In other words, a peak hold value "VKPEAK", which is the maximum value of the output signal of knock sensor 34 after the gate signal is turned on, is obtained.

When the gate signal is turned off and the gate is closed (step S404=YES), the process goes to step S405, where peak hold value "VKPEAK" at that time point, that is, the maximum value of the output signal of knock sensor 34 in the knocking determination period is read.

Then, based on peak hold value "VKPEAK", the knocking determination level is updated at step S406. The update of knocking determination level is performed in the following manner. First, based on logarithm conversion value "LVpk" of peak hold value "VKPEAK" sampled this time, distribution parameters indicative of distribution tendency of logarithm conversion value "LVpk", that is, distribution central value Vm and standard deviation value Σ shown in FIG. 5 are updated. Here, the update is performed based on the following equations (4)-(7). Specifically, by increasing and decreasing the values before update of distribution central value Vm and standard deviation value Σ based on comparison against logarithm conversion value "LVpk" of peak hold value "VKPEAK" sampled this time, distribution central value Vm and standard deviation value Σ are roughly determined.

$$(\text{when } LVpk > Vm) VM \leftarrow Vm + \Delta M \quad (4)$$

$$(\text{when } LVpk \leq Vm) VM \leftarrow Vm - \Delta M \quad (5)$$

(when Vm−Σ<LVpk<Vm, that is, when LVpk is in region A in FIG. 5)

$$\Sigma \leftarrow \Sigma - 2 \cdot \Delta S \quad (6)$$

(when LVpk≦Vm−Σ, or, when LVpk≧Vm, that is, when LVpk is in region B in FIG. 5)

$$\Sigma \leftarrow \Sigma + \Delta S \quad (7)$$

Here, it is assumed that update amount ΔM of distribution central value Vm is the value obtained by dividing the difference between logarithm conversion value "LVpk" sampled this time and distribution central value Vm before update by a prescribed value n1 (for example, "4"). It is also assumed that update amount ΔS of standard deviation value Σ is the value obtained by dividing update amount ΔM of distribution central value Vm by a prescribed value n2 (for example, "8").

Knocking determination level Vkd is obtained from the following equation (8) based on thus updated distribution central value Vm and standard deviation value Σ.

$$Vkd = Vm + U \times \Sigma \quad (8)$$

The value U is variably set based on the engine speed, load and the like, and basically, the higher the combustion pressure of an air-fuel mixture in combustion chamber 16, the value is set greater.

At step S407, occurrence of knocking in engine 1 is determined througn a comparison between knocking determination level Vkd and logarithm conversion value "LVpk". Specifically, when logarithm conversion value "LVpk" is within a range such as: knocking determination level Vkd<logarithm conversion value "LVpk", it is determined that knocking occurs in engine 1. Conversely, when logarithm conversion value "LVpk" is within a range such as: knocking determination level Vkd≧logarithm conversion value "LVpk", it is determined that no knocking occurs in engine 1.

Subsequently, on the precondition of the aforementioned knocking determination, embodiments of the present invention will be described. It is noted that, in the following description, as described above, unless otherwise specified, "change in the fuel injection ratio" encompasses change between injection only from the in-cylinder injector 11 (that is, in-cylinder injection ratio 100%) and injection only from the intake port injector 12 (that is, in-cylinder injection ratio 0%), i.e., switching of injection between in-cylinder injection and port injection, as well as change in the ratio of fuel injection from these injectors when both of these injectors simultaneously inject the fuel. As to the fuel injection ratio, in-cylinder injection ratio α+port injection ratio β=100%, and β=100−α as described above. Therefore, in the following, description will be given by using only in-cylinder injection ratio α representing the ratio of fuel injection from in-cylinder injector 11.

First Embodiment

Figure 6:
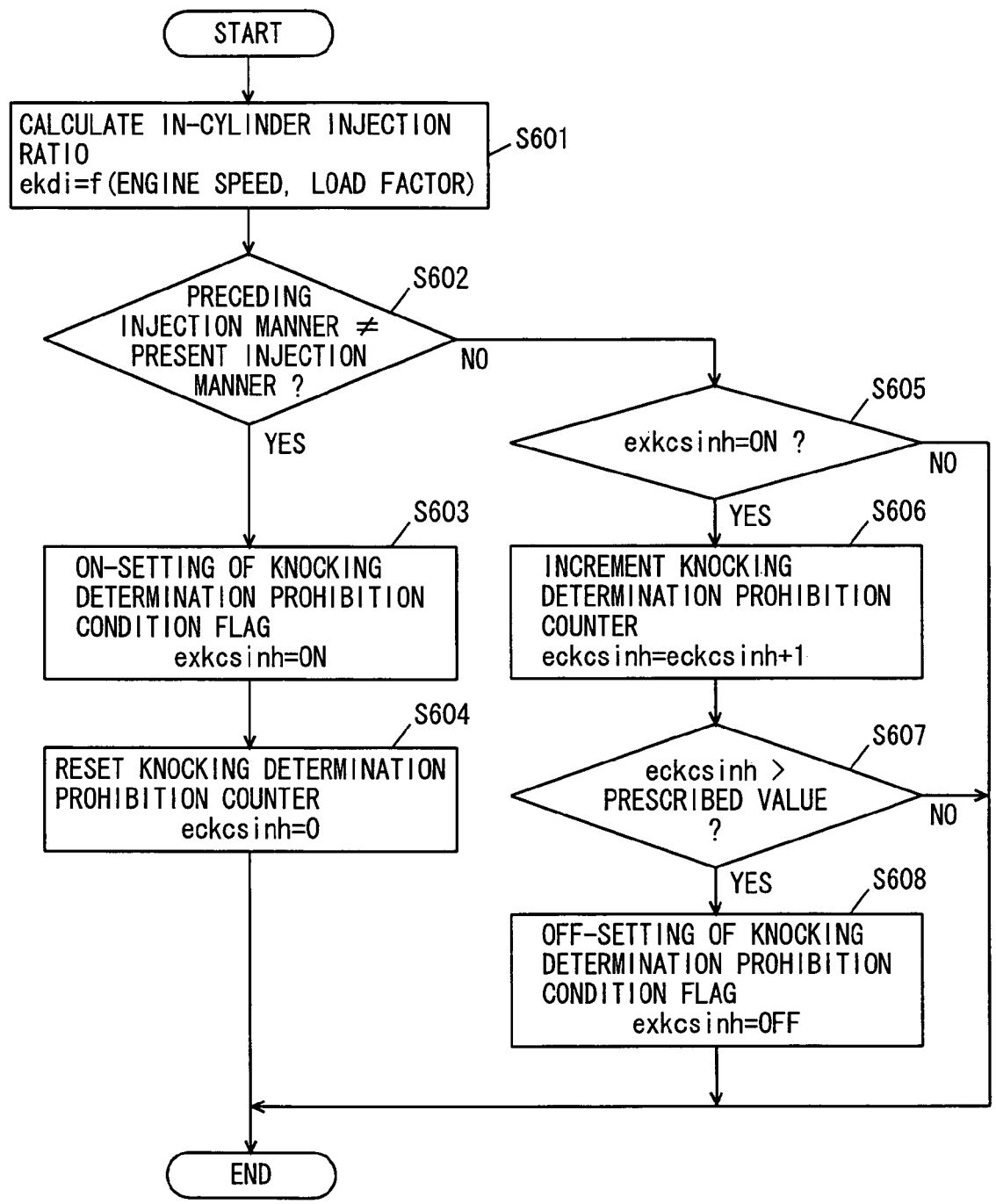
FIG. 6 is a flowchart showing an exemplary control routine in a first embodiment of the knocking determining apparatus of an internal combustion engine according to the present invention.

Referring to the flowchart of FIG. 6, a control procedure according to a first embodiment of a knocking determining apparatus of an internal combustion engine according to the present invention is described. This routine is executed, for example, each time a crank angle advances by a prescribed angle.

First, when control is started, in-cylinder injection ratio α to the total fuel injection ratio is calculated at step S601. More specifically, in-cylinder injection ratio α corresponding to the current operation state (denoted as "ekdi" in FIG.

6) is calculated from a map or by operation, based on the engine load factor obtained from airflow meter 4 or accelerator press-down degree sensor 33 and on the engine speed representing a calculation value from engine speed sensor 32, serving as various parameters representing the operation state.

At next step S602, whether or not switching between the injectors has been made is determined based on in-cylinder injection ratio $\alpha$. Specifically, whether or not change between injection solely from in-cylinder injector 11 (that is, in-cylinder injection ratio $\alpha=100\%$) and injection solely from intake port injector 12 (that.is, in-cylinder injection ratio $\alpha=0\%$) has been made, that is, whether or not switching between in-cylinder injection and port injection has been made, is determined based on whether or not a preceding injection manner and a present injection manner are different.

In the first routine cycle after the injection manner is changed, that is, after the injectors are switched, the process goes to step S603, where a knocking determination prohibition condition flag "exkcsinh" is set to on. At next step S604, a count value "eckcsinh" of a knocking determination prohibition counter is reset to 0, and the routine ends.

If it is determined at the aforementioned step S602 that the injection manner has not been changed, then the process goes to step S605, where whether or not knocking determination prohibition condition flag "exkcsinh" is on is determined. If it is off, the routine ends. On the other hand, if it is on, the process goes to step S606, where count value "eckcsinh" of the knocking determination prohibition counter is incremented by 1. Then, at the next step S607, whether or not this count value "eckcsinh" has exceeded a prescribed value is determined. The prescribed value is set, for example, to approximately 10 times of ignition for each one cylinder. If count value "eckcsinh" has not exceeded the prescribed value, the routine ends. Therefore, for a prescribed period immediately after the change of the injection manner (determined by the prescribed value described above), irrespective of the aforementioned "knocking determination period", knocking determination prohibition condition flag "exkcsinh" set to on at step S603 is maintained at the on state, and determination of knocking is prohibited.

It is noted that, as a result of the determination at step S607 as to whether or not count value "eckcsinh" has exceeded a prescribed value, if it has exceeded the prescribed value, then the process goes to step S608, where knocking determination prohibition condition flag "exkdsinh" is turned off and the routine ends. The program that executes this series of control routine constitutes the knocking determination prohibition unit. Accordingly, since the determination of knocking is prohibited, when there is change of injection manner, by this knocking determination prohibition unit for a prescribed period after the change, erroneous determination is not made, and erroneous retardation or advancement control of ignition timing is prevented.

Second Embodiment

Figure 7:
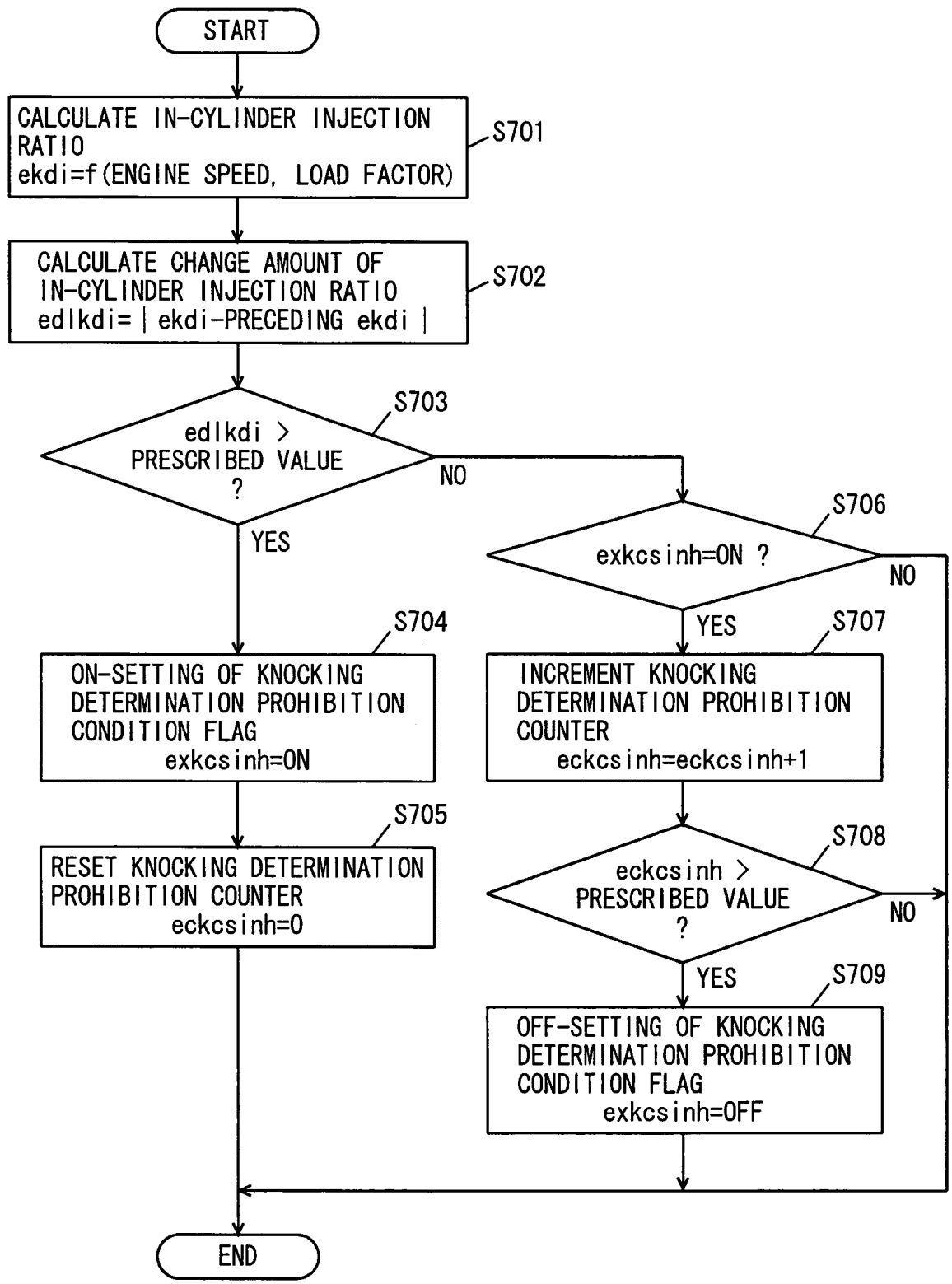
FIG. 7 is a flowchart showing an exemplary control routine in a second embodiment of the knocking determining apparatus of an internal combustion engine according to the present invention.

Next, referring to a flowchart of FIG. 7, a control procedure according to a second embodiment of the knocking determining apparatus of an internal combustion engine according to the present invention is described. This routine is executed also each time a crank angle advances by a prescribed angle. The second embodiment is different from the first embodiment described above in that, in the first embodiment, whether or not the knocking determination prohibition unit is effected is determined based on change in the injection manner, that is, switching between in-cylinder injection and port injection, whereas in the second embodiment, it is based on whether or not a fuel injection ratio is changed and on whether or not a change amount therein exceeds a prescribed value.

In the second embodiment, when control is started, the in-cylinder injection ratio to the total fuel injection ratio (denoted as "ekdi" in FIG. 7) is calculated at step S701 in a manner similar to the first embodiment, from a map or by operation, based on the engine load factor and the engine speed serving as parameters representing the operation state. At next step S702, change amount "edlkdi" of in-cylinder injection ratio is calculated. This is obtained as an absolute value of the difference between "ekdi" obtained at step S701 and the preceding in-cylinder injection ratio. Next, at step S703, whether or not change amount "edlkdi" obtained as an absolute value exceeds a prescribed value is determined. Specifically, whether or not significant change in the in-cylinder injection ratio by more than a prescribed value (for example, 50%) has been made is determined.

If change amount "edlkdi" has exceeded the prescribed value, then the process goes to step S704, where knocking determination prohibition condition flag "exkcsinh" is set to on. Then, at next step S705, count value "eckcsinh" of the knocking determination prohibition counter is set to 0, and the routine ends.

On the other hand, at the aforementioned step S703, if it is determined that change amount "edlkdi" has not exceeded the prescribed value in the next routine cycle, then the process goes to step S706, where whether or not knocking determination prohibition condition flag "exkcsinh" is on is determined. If it is off, then the routine ends. On the other hand, if it is on, then the process goes to step S707, where count value "eckcsinh" of the knocking determination prohibition counter is incremented by 1. Then, at the next step S708, whether or not this count value "eckcsinh" has exceeded a prescribed value is determined. The prescribed value is set, for example, to approximately 10 times of ignition for each one cylinder, as in the previous embodiment. If count value "eckcsinh" has not exceeded the prescribed value, the routine ends. Therefore, for a prescribed period immediately after the change of the fuel injection ratio (determined by the prescribed value), knocking determination prohibition condition flag "exkcsinh" set to on at step S704 is maintained at the on state, and determination of knocking is prohibited.

It is noted that, as a result of the determination at step S708 as to whether or not count value "eckcsinh" has exceeded a prescribed value, if it has exceeded the prescribed value, then the process goes to step S709, where knocking determination prohibition condition flag "exkcsinh" is set to off and the routine ends. The program that executes this series of control routine constitutes the knocking determination prohibition unit. Accordingly, since the determination of knocking is prohibited, when there is change of injection manner, by this knocking determination prohibition unit for a prescribed period after the change, erroneous determination is not made, and erroneous retardation or advancement control of ignition timing is prevented.

Third Embodiment

Figure 8:
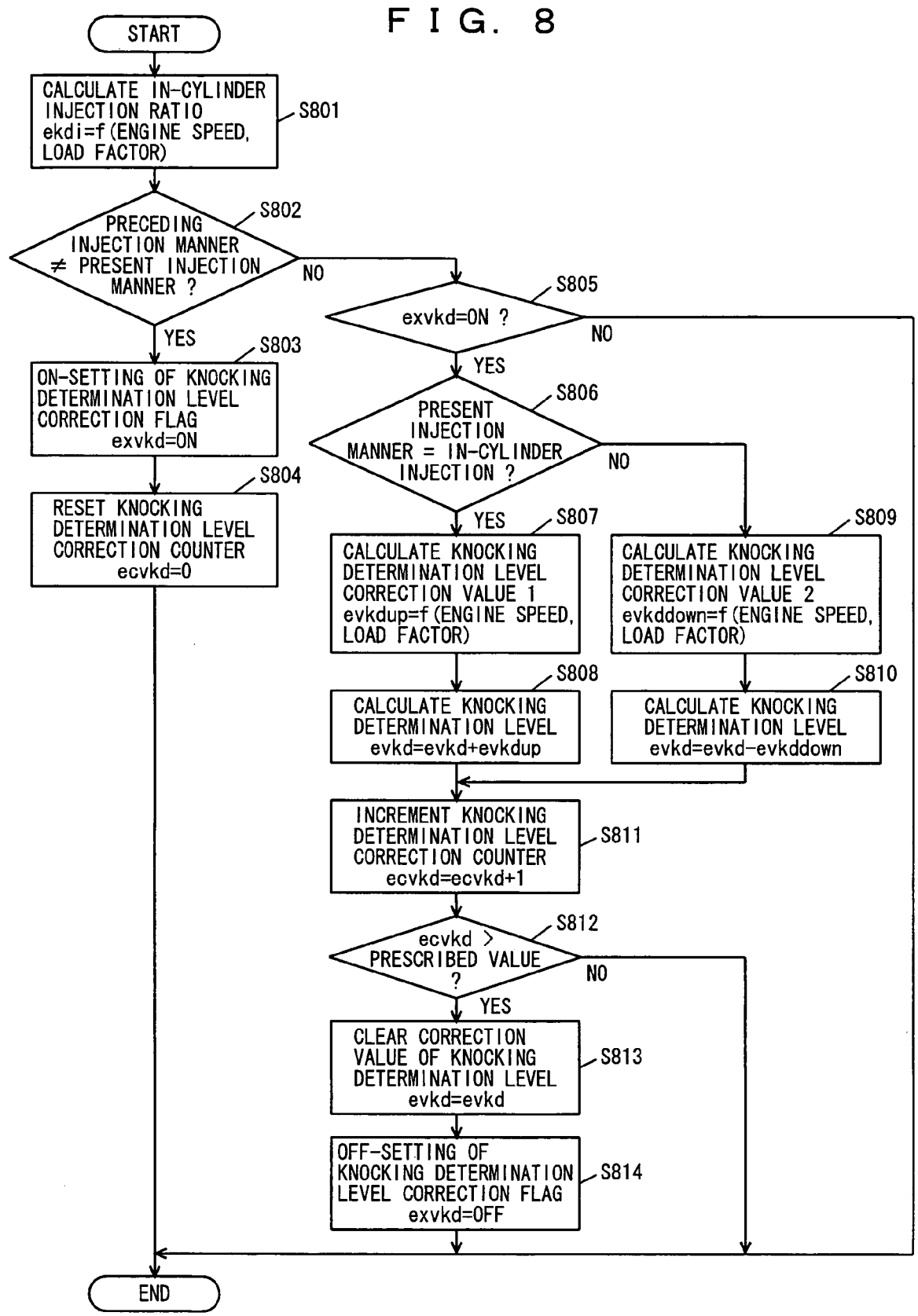
FIG. 8 is a flowchart showing an exemplary control routine in a third embodiment of the knocking determining apparatus of an internal combustion engine according to the present invention.

Next, referring to a flowchart of FIG. 8 and a time chart of FIG. 9, a control procedure according to a third embodiment of the knocking determining apparatus of an internal combustion engine according to the present invention is described. This routine is executed also each time a crank angle advances by a prescribed angle. In the third embodiment, when there is switching of injection manner, the knocking determination level is changed for a prescribed period after the switching change, so that knocking occurrence can suitably be detected following a change in an engine vibration level associated with a change in fuel injection ratio.

Accordingly, when control is started, at step S801, in-cylinder injection ratio a is obtained. More specifically, in-cylinder injection ratio α (denoted as "ekdi" in FIG. 8) corresponding to the current operation state is calculated from a map or by operation.

Then, at next step S802, whether or not switching of injectors has been made is determined based on in-cylinder injection ratio α. Specifically, whether or not change between injection solely from in-cylinder injector 11 (that is, in-cylinder injection ratio α=100%) and injection solely from intake port injector 12 (that is, in-cylinder injection ratio α=0%) has been made, that is, whether or not switching between in-cylinder injection and port injection has been made, is determined based on whether or not a preceding injection manner and a present injection manner are different.

Accordingly, when there is a change in injection manner, that is, when the injectors are switched, the process goes to step S803, where knocking determination level correction flag "exvkd" is set to on. Then, at next step S804, a count value "ecvkd" of the knocking determination level correction counter is reset to 0, and the routine ends.

On the other hand, if it is determined that the injection manner has not been changed at the aforementioned step S802, then the process goes to step S805, where whether or not knocking determination level correction flag "exvkd" is on is determined. If it is off, the routine ends. On the other hand, if it is on, the process goes to step S806, where whether or not the current injection manner is the injection from in-cylinder injector 11, that is, in-cylinder injection is determined. If it is "YES" at step S806, that is, if it is determined that it is in-cylinder injection, in other words, if it is determined that port injection is switched to in-cylinder injection, the process goes to step S807. On the other hand, if it is determined that it is not in-cylinder injection, that is, if it is determined as "NO", in other words, if it is determined that in-cylinder injection is switched to port injection, then the process goes to step S809.

Then, at step S807, corresponding to the switching from port injection to in-cylinder injection, "knocking determination level correction value 1" (denoted as "evkup" in FIG. 8), which will be described in detail later, is calculated from a map or by operation, based on the engine load factor and the engine speed serving as parameters representing the operation state. At step S809, corresponding to the switching from in-cylinder injection to port injection, "knocking determination level correction value 2" (denoted as "evkdown" in FIG. 8), which will be described in detail later, is similarly calculated from a map or by operation, based on the engine load factor and the engine speed serving as parameters representing the operation state.

At step S808 that follows step S807 and at step S810 that follows step S809, using calculated "knocking determination level correction value 1" and "knocking determination level correction value 2", respectively, "knocking determination level" (="evkd") is calculated.

Then, after steps S808 and S810, the process goes to step S811, where count value "ecvkd" of the knocking determination level correction counter is incremented by 1. Then, at the next step S812, whether or not count value "ecvkd" has exceeded a prescribed value is determined. The prescribed value is set, for example, to approximately 10 times of ignition for each one cylinder. If count value "ecvkd" has not exceeded the prescribed value, the routine ends. Therefore, for a prescribed period immediately after the change of the injection manner (determined by the prescribed value), knocking determination level correction flag "exvkd" set to on at step S803 is maintained at the on state, and the knocking determination level is corrected.

It is noted that, as a result of the determination at step S812 as to whether or not count value "ecvkd" has exceeded a prescribed value, if it has exceeded the prescribed value, then the process goes to step S813, where knocking determination level correction value is cleared. The process further goes to step S814, where knocking determination level correction flag "exvkd" is set to off, and the routine ends. The program that executes this series of control routine constitutes the knocking determination level change unit. Accordingly, since the knocking determination level is changed, when there is change of injection manner, by this knocking determination level change unit for a prescribed period after the change, erroneous determination is not made, and erroneous retardation or advancement control of ignition timing is prevented.

Referring to the time chart of FIG. 9, further description is provided below as to a manner in which, when a change of fuel injection ratio including the aforementioned switching of injection manner occurs, the knocking determination level is changed for a prescribed period following the switching or change. Here, FIG. 9(A) shows, as an example where the fuel injection ratio from in-cylinder injection 11 increases, an example where port injection is switched to in-cylinder injection at time point td, whereas FIG. 9(B) shows, as an example where the fuel injection ratio from intake port injector 12 increases, an example where in-cylinder injection is switched to port injection at time point tp.

As can be seen from FIG. 9(A), when port injection is switched to in-cylinder injection at time point td, an engine vibration increases, and an output level of knock sensor 34 increases even when knocking does not occur. Accordingly, in the third embodiment, in accordance with this switching, to a normal knocking determination level "evkd", "knocking determination level correction value 1 ("evkdup")" is added as indicated by an arrow in FIG. 9(A) corresponding to the switching from port injection to in-cylinder injection for a prescribed period after the switching (from td to tdc), and set as a new knocking determination level "evkd" (step S808). Thus, in FIG. 9(A), when knocking determination level "evkd" is kept normal and unchanged as indicated by a fine line, due to an increase in the output level of knock sensor 34 simply from an increase in an operation noise, as shown in region X, the output level of knock sensor 34 exceeds knocking determination level "evkd". However, as knocking determination level "evkd" is increased by one correction value, an erroneous determination due to the increase in the operation noise is prevented.

On the other hand, as can be seen from FIG. 9(B), when in-cylinder injection is switched to port injection at time point tp, an output level of knock sensor 34 decreases due to a decrease in operation noise. Accordingly, in the third embodiment, in accordance with this switching, to a normal knocking determination level "evkd", "knocking determination level correction value 2 ("evkddown")" is subtracted as indicated by an arrow in FIG. 9(B) corresponding to the switching from in-cylinder injection to port injection for a prescribed period (from tp to tpc) after the switching, and set as a new knocking determination level "evkd" (step S810). Thus, in FIG. 9(B), when knocking determination level "evkd" is kept normal and unchanged as indicated by a fine line, an erroneous determination of no knocking occurrence is prevented, which otherwise may be made based on an excessively great deviation between the output level of knock sensor 34 and knocking determination level "evkd" as shown in region Y due to the decreasing output level of knock sensor 34 simply resulted from the decreasing operation noise. Thus, knocking occurrence after stabilization of background noise due to erroneous advancement of ignition timing can be suppressed.

Fourth Embodiment

Figure 10:
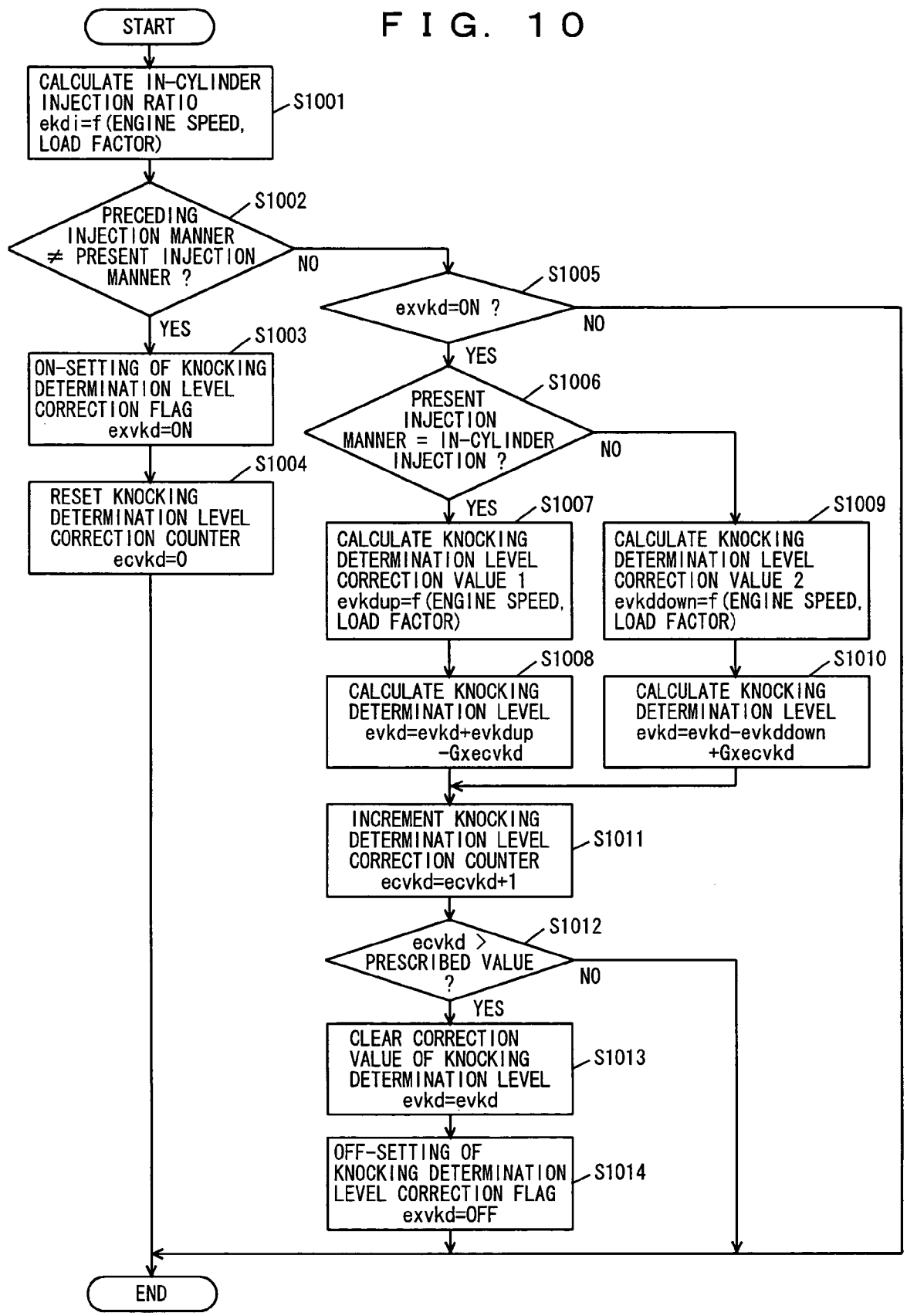
FIG. 10 is a flowchart showing an exemplary control routine in a fourth embodiment of the knocking determining apparatus of an internal combustion engine according to the present invention.

Next, referring to a flowchart of FIG. 10 and a time chart of FIG. 11, a control procedure according to a fourth embodiment of the knocking determining apparatus of an internal combustion engine according to the present invention is described. This routine is also executed every time a crank angle advances by a prescribed angle. In contrast to the previous embodiment in which the knocking determination level is uniformly changed, when there is a change of injection manner, for a prescribed period after the switching change, the fourth embodiment is different in that the knocking determination level is changed in accordance with an elapsed time. Hence, the basic control manner are the same. Therefore, the identical control steps are simply noted so, and description thereof is not repeated.

Steps S1001-S1004 executed by starting control are identical to steps S801-S804 in the previous embodiment, and respectively execute: calculation of in-cylinder injection ratio α corresponding to the current operation state (denoted as "ekdi" in FIG. 10); determination of occurrence of injection manner switching; on-setting of knocking determination level correction flag "exvkd"; and 0-resetting of count value "ecvkd" of knocking determination level correction counter.

At step S1005, whether or not knocking determination level correction flag "exvkd" is on is determined. When it is off, the routine ends. On the other hand, when it is on, at next step S1006, similarly to step S806, whether or not the current injection manner is injection from in-cylinder injector 11 is determined, that is, whether or not it is in-cylinder injection is determined. If "YES" at step 51006, that is, if it is determined to be in-cylinder injection, in other words, if it is determined that port injection is switched to in-cylinder injection, the process goes to step S1007. On the other hand, if it is determined not to be in-cylinder injection at step S1006, that is, when it is "NO", in other words, if it is determined that in-cylinder injection is switched to port injection, the process goes to step S1009.

Then, at step S1007, corresponding to the switching from port injection to in-cylinder injection, based on the load factor and engine speed as parameters indicative of an operation state, "knocking determination level correction value 1" (denoted as "evkup" also in FIG. 10) is calculated from a map or by operation. At step S1009, corresponding to the switching from in-cylinder injection to port injection, similarly based on the load factor and engine speed as parameters indicative of an operation state, "knocking determination level correction value 2" (denoted as "evkdown" also in FIG. 10) is calculated from a map or by operation.

At step S1008 that follows step S1007 and at step S1010 that follows step S1009, using calculated "knocking determination level correction value 1" and "knocking determination level correction value 2", respectively, and attenuation terms, new "knocking determination level" (="evkd") is calculated. In the present embodiment, new "knocking determination level" (="evkd") is calculated by the following equations (9) and (10), using count value "ecvkd" of the knocking determination level correction counter and a prescribed attenuation coefficient G as the attenuation terms.

When switching from port injection to in-cylinder injection:

$$\text{``evkd''}=\text{``evkd''}+\text{``evkdup''}-G\times\text{``ecvkd''} \quad (9)$$

When switching from in-cylinder injection to port injection:

$$\text{``evkd''}=\text{``evkd''}-\text{``evkddown''}+G\times\text{``ecvkd''} \quad (10)$$

where ("evkdup"−G×"ecvkd") is a positive value and ("evkddown"+G×"ecvkd") is a negative value.

After these steps S1008 and S1010, the process goes to step S1011, where count value "ecvkd" of the knocking determination level correction counter is incremented by 1. Steps S1011 to S1014 are identical to steps S811 to S814 of the previous embodiment, where the aforementioned increment, determination of whether or not count value "ecvkd" has exceeded a prescribed value, clearance of the correction value of knocking determination level when the prescribed value is exceeded, and off-setting of knocking determination level correction flag "exvkd", are respectively executed. Then, the routine ends. The program executing the series of control routine is configured to change the knocking determination level in accordance with the elapsed time in the knocking determination level change unit.

Referring to the time chart of FIG. 11, further description is provided below as to a manner in which, when there is change of fuel injection ratio including the aforementioned switching of injection manner, the knocking determination level is changed in accordance with the elapsed time for a prescribed period following this switching or change. Here, FIG. 11(A) shows, as an example where the fuel injection ratio from in-cylinder injection 11 increases, an example where port injection is switched to in-cylinder injection at time point td, whereas FIG. 11(B) shows, as an example where the fuel injection ratio from intake port injector 12 increases, an example where in-cylinder injection is switched to port injection at time point tp. Since they are respectively identical to FIGS. 9(A) and 9(B) except for the manner of changing knocking determination level "evkd", only the difference will be described.

Accordingly, in the fourth embodiment, in accordance with switching, to a normal knocking determination level "evkd", "knocking determination level correction value 1 ("evkdup")" is added as indicated by an arrow in FIG. 11(A) corresponding to the switching from port injection to in-cylinder injection, and for a prescribed period after the switching (from td to tdc), this correction value 1 is attenuated in accordance with the elapsed time (a correction portion corresponding to attenuation terms is indicated in FIG. 11(A) by a dot-and-dashed line), and set as a new knocking determination level "evkd" (step S1008). Thus, as shown in FIG. 11(A), this new knocking determination level "evkd" is set based on the background noise level that is stabilized as time elapses, and thereby more quickly approximates normal knocking determination level "evkd" indicated by a fine line. Therefore, the knocking determination can be carried out more accurately.

On the other hand, when in-cylinder injection is switched to port injection, in accordance with this switching, to a normal knocking determination level "evkd", "knocking determination level correction value 2 ("evkddown")" is subtracted as indicated by an arrow in FIG. 11(B) corresponding to the switching from in-cylinder injection to port injection, and for a prescribed period after the switching (from td to tdc), this correction value 2 is attenuated in accordance with the elapsed time (a correction portion corresponding to attenuation terms is indicated in FIG. 11(B) by a dot-and-dashed line), and set as a new knocking determination level "evkd" (step S1010). Thus, as shown in FIG. 11(B), this new knocking determination level "evkd" is set based on the background noise level that is stabilized as time elapses, and thereby more quickly approximates normal knocking determination level "evkd" indicated by a fine line. Therefore, the knocking determination can be carried out more accurately.

It is noted that, the aforementioned attenuation to "knocking determination level correction value" is not necessarily started simultaneously with the switching or change, and it may be started after a prescribed period (which is shorter than the aforementioned time period from td to tdc or from tp to tpc) has passed. As to the attenuation amount, upper limit or lower limit may be set, since the knocking determination level is only necessary to be set to a value greater than the level of operation noise by a prescribed level.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A knocking determining apparatus of an internal combustion engine that includes an in-cylinder injector and an intake port injector and that determines knocking based on an output signal of a knock sensor, comprising
a knocking determination prohibition unit prohibiting, when a ratio of fuel injection from said in-cylinder injector and said intake port injector is changed, knocking determination for a prescribed period after that change.

2. A knocking determining apparatus of an internal combustion engine that includes an in-cylinder injector and an intake port injector and that determines knocking based on an output signal of a knock sensor, comprising
a knocking determination level change unit changing, when a ratio of fuel injection from said in-cylinder injector and said intake port injector is changed, a knocking determination level for a prescribed period after that change.

3. The knocking determining apparatus according to claim 2, wherein
said knocking determination level change unit increases the knocking determination level when a ratio of fuel injection from said in-cylinder injector is increased.

4. The knocking determining apparatus according to claim 2, wherein
said knocking determination level change unit decreases the knocking determination level when a ratio of fuel injection from said intake port injector is increased.

5. The knocking determining apparatus according to claim 2, wherein
said knocking determination level change unit changes the knocking determination level in accordance with an elapsed time.

6. A knocking determining apparatus of an internal combustion engine that includes an in-cylinder injector and an intake port injector and that determines knocking based on an output signal of a knock sensor, comprising
knocking determination prohibition means for prohibiting, when a ratio of fuel injection from said in-cylinder injector and said intake port injector is changed, knocking determination for a prescribed period after that change.

7. A knocking determining apparatus of an internal combustion engine that includes an in-cylinder injector and an intake port injector and that determines knocking based on an output signal of a knock sensor, comprising
knocking determination level change means for changing, when a ratio of fuel injection from said in-cylinder injector and said intake port injector is changed, a knocking determination level for a prescribed period after that change.

8. The knocking determining apparatus according to claim 7, wherein
said knocking determination level change means includes means for increasing the knocking determination level when a ratio of fuel injection from said in-cylinder injector is increased.

9. The knocking determining apparatus according to claim 7, wherein
said knocking determination level change means includes means for decreasing the knocking determination level when a ratio of fuel injection from said intake port injector is increased.

10. The knocking determining apparatus according to claim 7, wherein
said knocking determination level change means includes means for changing the knocking determination level in accordance with an elapsed time.

11. The knocking determining apparatus according to claim 3, wherein
said knocking determination level change unit changes the knocking determination level in accordance with an elapsed time.

12. The knocking determining apparatus according to claim 4, wherein
said knocking determination level change unit changes the knocking determination level in accordance with an elapsed time.

13. The knocking determining apparatus according to claim 8, wherein
said knocking determination level change means includes means for changing the knocking determination level in accordance with an elapsed time.

14. The knocking determining apparatus according to claim 9, wherein said knocking determination level change means includes means for changing the knocking determination level in accordance with an elapsed time.

* * * * *